UNITED STATES PATENT OFFICE.

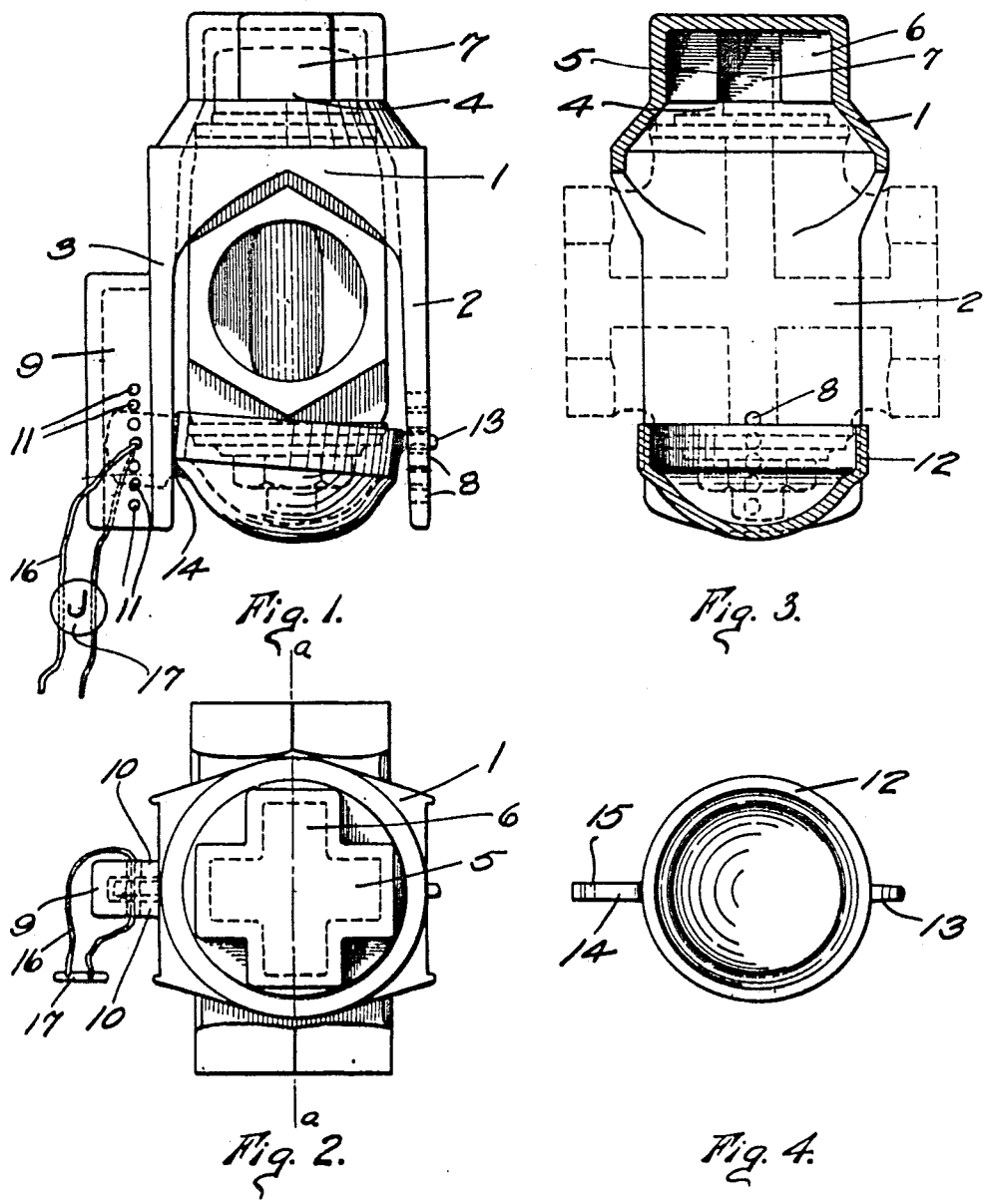

BIRUM G. CAMPBELL, OF JACKSON, MICHIGAN.

STOP-COCK SEAL.

1,131,821.  Specification of Letters Patent.  Patented Mar. 16, 1915.

Application filed August 4, 1913. Serial No. 782,792.

*To all whom it may concern:*

Be it known that I, BIRUM G. CAMPBELL, a citizen of the United States, and a resident of the city of Jackson, in the county of Jackson and State of Michigan, have invented a certain new, useful, and Improved Stop-Cock Seal, of which the following, taken in connection with the accompanying drawing, is a specification fully disclosing the invention, such that others may understand the construction and operation of the same.

This invention relates to seals which are used with stop-cocks, said stop-cocks being placed in a conduit which carries fluids of different kinds and which are used to turn off or turn on the fluid as desired.

My invention is of utility irrespective of the nature of the fluid carried by the conduit but it is of especial utility when used in connection with conduits carrying natural or artificial gas to houses for use in lighting and heating. In this connection it is the uniform practice to have the company furnishing the gas, put in the meter for measuring the supply used by a certain house, and an employee of the company is always sent whenever gas is to be supplied or cut off from any certain house. It is also customary for such employee when the gas is cut off, to seal the gas cock so that it cannot be turned on again without breaking the seal in some manner. The stop-cocks used are not of standard size and vary much in this respect so that an employee when directed to cut off the gas from a particular house must carry a large number of seals with him in order to be sure that one of them at least will answer the purpose. It is also desirable that the gas when once turned on shall not be turned off either wholly or in part without the knowledge of the company supplying it.

In my invention, I have constructed a seal for stop-cocks which is adapted to be applied to various sizes of cocks so that one pattern of seal is all that is required to be kept in stock. Also this seal is adapted to be applied to the stop-cock when it is in either of its two positions, that is when turned so that the gas is entirely cut off or when turned so that the gas is on its full pressure and amount. With seals of this kind, it is not necessary to have a large number of different patterns of seals for each size and type of stop-cock used, nor is it necessary for the employee to carry any seals with him at all except when the meter is first installed in a house. At that time, the seal will be taken along with the meter, applied to the cock with it in its gas supplying position, and fixed thereto so as not to be taken therefrom. If at any time the gas has to be turned off, an employee may release the seal, turn the stop-cock to the proper position and then replace the seal fixing it so that gas cannot be again turned on. My invention provides a simple and practical means of accomplishing these results. It is also a desirable feature of seals of this type that their fixing to and release from the stop-cock shall be accomplished only by a proper employee of the company. I have provided in my invention a means to effect this end, or at least if anyone other than an authorized person does tamper with the seal, it can be easily and readily detected. These and various other objects and purposes not specifically enumerated will be apparent as the description of the embodiment shown in the drawings progresses, in which, Figure 1 is a side elevation of my stop-cock seal showing it as applied to a stop-cock. Fig. 2 is a plan view thereof. Fig. 3 is a sectional view as taken on the line *a—a*, Fig. 2, the stop-cock being shown in dotted outline. Fig. 4 is a plan view of the movable and adjustable member of the seal.

Similar reference numerals refer to similar parts throughout the several views of the drawing.

The main or relatively stationary member of my seal is in the form of a stirrup 1 having two depending sides or legs 2 and 3 connected at their tops by the upper portion 4 as shown. This upper portion is hollow to receive the upper part of the stop-cock, the sides or legs 2 and 3 passing on either side of the cock as shown, and there is provided in such upper portion, recesses 5 and 6 to receive the flattened head 7 of the stop-cock, such recesses lying at right angles to each other as shown in dotted lines, Fig. 2, and making in effect a cross. When the head 7 lies so as to enter the recess 5, the cock is turned so as to obstruct the passage of any gas or other fluid therethrough and when turned so as to enter the recess 6, the fluid has free passage through the cock. It will be evident accordingly that the seal is adapted to be applied to the stop-cock in either of the two positions of the head, and that when so applied, it is impossible to gain access to the head to turn the cock from the position in which it is left.

The leg 2 of the stirrup is provided with a series of openings or holes 8 which are positioned one above the other for a distance from the lower end of the leg. The opposite leg 3 has formed integrally therewith a projecting housing 9 having spaced apart sides 10 which are pierced with a series of openings 11 as shown, these openings lying one above the other for a distance from the lower edge of the housing. The movable or adjustable member of the seal is in the form of a cup 12 having projecting at diametrically opposed points on the outer surface thereof, and near the upper edges of the cup, the lugs 13 and 14, lug 13 being shaped to readily enter any of the openings 8 in the leg 2, while the lug 14 is in the shape of a flattened piece of metal and adapted to pass between the sides 10 of the housing 9. Such lug 14 is pierced as at 15 to provide an opening therein which as the lug is moved between the sides 10 comes into alinement with the openings 11 formed therein.

When this seal is applied to a stop-cock, either in its open or closed position, the head 7 thereof enters one of the recesses 5 or 6, and the legs 2 and 3 pass alongside of the stop-cock, the ends thereof extending below the lower limits of the stop-cock. The adjustable member may then be attached to the stirrup or relatively stationary member 1 by insertion of the lug 13 through one of the holes 8, after which the lug 14 is placed between the sides 10 of the housing and carried upward until the base of the cup portion 12 engages against the lower part of the stop-cock. The hole 15 in lug 14 will be substantially in alinement with the holes in the side pieces 10, no matter at what position the upward movement of lug 14 is stopped owing to the close placing of the holes in side pieces 10, and a wire, such as shown at 16 may be carried therethrough to hold the lug 14 in fixed relation to the sides of the housing. In this connection I have made use of the well known lead seal, which is commonly used in sealing cars. In such seals there is provided a lead body 17 with a wire secured at one end therein, the body having an opening therethrough for freely receiving the free end of the wire, after it has been passed through parts that are to be secured together, in this instance the sides of the housing and the lug 14. The lead body is then crushed so as to firmly secure the wire in the body; and it is intended in the use of this gas cock seal that an identifying character such as indicated in Fig. 1 may be impressed in the lead body when crushed on the wire so that it will be easy to identify the one who did the sealing. The release of the stirrup member from the stop-cock after once secured in this manner can be effected only by breaking the lead seal 17 or the wire 16 forming a part thereof, and any tampering therewith may be readily detected. The type of lead seal used may be such as seems advisable, the one illustrated being a common and well known form.

With this construction as above outlined, it is apparent that I have provided a seal that may be left on the stop-cock at all times either when the gas is passing therethrough or when it is stopped from passage. It is also evident that this type of seal is applicable to stop-cocks of different sizes, the stirrup being made large enough that the legs 2 and 3 may pass alongside the stop-cock of the largest size used and the movable member having adjustability as described such that when a small size of stop-cock is to be sealed, the movable member is secured nearer the upper parts of the stirrup legs, thus forcing the head of the stop-cock into one of the retaining recesses 5 or 6 whereby it is prevented from turning after the seal is once secured in place. The heads of most stop-cocks used are rectangular in cross section and the shape of the recesses 5 and 6 as such as to care for such heads. In a few instances the heads are square, in which case the head will fit in the space made by the intersection of the two recesses 5 and 6 and will be held from turning after the seal is affixed by engagement with the shoulders formed at the intersection of such recesses. The openings in the legs 2 and in the sides of the housing 9 are placed close together so that there is a large number of adjustments that can be made for the movable adjusting member, adapting the seal to use with various sizes of stop-cocks and permitting the movable member to fit closely against the under portion of the stop-cock without the looseness which might be present if there was but slight range of adjustment.

I have fully described a complete and operative embodiment of my invention and one fully answering the purposes and objects desired.

Various minor changes may be resorted to without departing from the invention, and I, accordingly, do not desire to be limited to the specific embodiment shown. All modifications falling within the scope of the appended claims are to be considered as coming within the scope of my invention.

What I claim as new and desire to secure by Letters Patent is:—

1. A seal for stop cocks comprising a hollow head adapted to receive the upper portion and the operating head of a stop-cock and inclose them, members integral with said hollow head extending therefrom and spaced apart adapted to lie along side the sides of the cock, and a member adjustably connected to and between the said members, said member including a cup portion to receive and completely inclose the lower end portion of the stop cock, and oppositely disposed projections for engagement with the said side members of the seal, one of said projections being received in openings in one of said side members, and the other of said projections being adapted to be connected at a plurality of positions to the other side member.

2. A seal for stop-cocks comprising a hollow portion for receiving and inclosing the upper part of the cock and the operating head thereof and spaced apart members connected therewith for embracing the sides of the cock, each of said members being provided with a series of openings in alinement, and means for engaging the lower portion of the cock, said means including a cup for receiving and completely inclosing the lower part of the cock with diametrically opposed projections extending therefrom, one of said projections being adapted to pass through the openings in one of said members, and the other of said projections being adapted to be securely attached to the other of said members by fastening means passing through the openings therein and through the said projection.

3. A seal for stop-cocks comprising a portion for engaging with the operating head of the cock to prevent operation thereof and side members connected therewith for embracing the sides of the cock, one of said members being provided with a series of openings in vertical alinement, a housing having spaced apart sides connected to the other side member said housing being provided with a series of openings in each side in vertical alinement, a member adapted to be positioned between said side members having diametrically opposed lugs one of which is adapted to enter the openings in the first side member and the other to pass between the sides of the housing, said second lug having an opening therein whereby it may be secured to the housing by insertion of a retaining device through the openings in the housing sides and the lug.

In testimony whereof, I have hereunto affixed my signature in the presence of two witnesses.

BIRUM G. CAMPBELL.

Witnesses:
A. ARTHUR SPAULDING,
ORABEL B. CASE.

Copies of this patent may be obtained for five cents each, by addressing the "Commissioner of Patents, Washington, D. C."